United States Patent
Gouke

(10) Patent No.: US 7,592,081 B2
(45) Date of Patent: Sep. 22, 2009

(54) MAGNETIC RECORDING MEDIUM AND MAGNETIC STORAGE DEVICE

(75) Inventor: Takashi Gouke, Higashine (JP)

(73) Assignee: Fujitsu Limited, Kawasaki (JP)

( * ) Notice: Subject to any disclaimer, the term of this patent is extended or adjusted under 35 U.S.C. 154(b) by 421 days.

(21) Appl. No.: 11/077,461

(22) Filed: Mar. 10, 2005

(65) Prior Publication Data
US 2006/0141293 A1    Jun. 29, 2006

(30) Foreign Application Priority Data
Dec. 27, 2004    (JP) .............................. 2004-377037

(51) Int. Cl.
G11B 5/66    (2006.01)
(52) U.S. Cl. .................................. 428/831.2
(58) Field of Classification Search ................. 428/831, 428/831.1, 831.2
See application file for complete search history.

(56) References Cited

U.S. PATENT DOCUMENTS

| | | | |
|---|---|---|---|
| 6,162,526 A | 12/2000 | Kobayashi | |
| 6,383,668 B1 | 5/2002 | Fullerton et al. | |
| 6,537,684 B1 | 3/2003 | Doerner et al. | |
| 6,562,489 B2 | 5/2003 | Abarra et al. | |
| 6,670,055 B2* | 12/2003 | Tomiyasu et al. | 428/831.1 |
| 6,709,775 B1 | 3/2004 | Takahashi et al. | |
| 2002/0119350 A1 | 8/2002 | Tomiyasu et al. | |
| 2004/0001975 A1 | 1/2004 | Hikosaka et al. | |
| 2005/0249981 A1* | 11/2005 | Cheng et al. | 428/831 |

FOREIGN PATENT DOCUMENTS

| | | |
|---|---|---|
| CN | 1419688 | 5/2003 |
| CN | 1446354 | 10/2003 |
| EP | 1059629 | * 12/2000 |
| JP | 10-233014 | 9/1998 |

(Continued)

OTHER PUBLICATIONS

Machine translation of JP 2002-312926, Fujitsu LTD, Japan, Oct. 2002.*

(Continued)

*Primary Examiner*—Holly Rickman
(74) *Attorney, Agent, or Firm*—Greer, Burns & Crain, Ltd.

(57) ABSTRACT

A magnetic recording medium is disclosed that is able to increase a coercive force Hc of a recording layer and improve a signal-to-noise ratio of the recording layer without degradation of a thermal fluctuation resistance of the recording layer, and enables high density recording. The magnetic recording medium includes a substrate, a seed layer formed from a crystalline material, a grain diameter control layer, an underlying layer, and a recording layer. The grain diameter control layer is formed from an Ag film or a W film, to be a dispersed film or a continuous film on the seed layer. The grain diameter control layer acts as growing nuclei of the underlying layer formed thereon, and controls crystal grain diameters of the underlying layer. Especially, when the grain diameter control layer is deposited to be a dispersed layer, the underlying layer grows on the seed layer and the grain diameter control layer, and due to influence of the surface of the seed layer, the crystalline property of the underlying layer is improved.

11 Claims, 6 Drawing Sheets

FOREIGN PATENT DOCUMENTS

| | | |
|---|---|---|
| JP | 2000-285431 | 10/2000 |
| JP | 2002-312926 | 10/2002 |
| JP | 2003-059037 | 2/2003 |
| JP | 2003-132515 | 5/2003 |
| JP | 2004-303377 | 10/2004 |
| WO | WO 99/24973 | 5/1999 |
| WO | WO 02/13190 | 2/2002 |

OTHER PUBLICATIONS

Arnoldussen et al; "Correlation of Thermal Stability and Signal-to-Noise Ration of Thin Film Recording Media": IEEE Trans on Magn., Vol. 36, No. 1; pp. 92-97; Jan. 2000.

* cited by examiner

FIG.4

| | Ag FILM AVERAGE THICKNESS (nm) | COERCIVE FORCE (kA/m) | S/N RATIO (dB) |
|---|---|---|---|
| EXAMPLE FOR COMPARISON | — | 369.6 | 20.3 |
| MAGNETIC DISK 1-1 | 0.5 | 378.3 | 20.5 |
| MAGNETIC DISK 1-2 | 1.0 | 386.8 | 20.6 |
| MAGNETIC DISK 1-3 | 2.0 | 389.8 | 20.6 |
| MAGNETIC DISK 1-4 | 3.0 | 380.8 | 20.5 |
| MAGNETIC DISK 1-5 | 4.0 | 377.1 | 20.4 |
| MAGNETIC DISK 1-6 | 5.0 | 364.2 | 20.3 |

FIG.5

| | W FILM AVERAGE THICKNESS (nm) | COERCIVE FORCE (kA/m) | S/N RATIO (dB) |
|---|---|---|---|
| EXAMPLE FOR COMPARISON | — | 369.6 | 20.3 |
| MAGNETIC DISK 2-1 | 0.5 | 384.7 | 20.6 |
| MAGNETIC DISK 2-2 | 1.0 | 384.4 | 20.6 |
| MAGNETIC DISK 2-3 | 2.0 | 387.3 | 20.6 |
| MAGNETIC DISK 2-4 | 3.0 | 387.9 | 20.5 |
| MAGNETIC DISK 2-5 | 4.0 | 389.5 | 20.5 |
| MAGNETIC DISK 2-6 | 5.0 | 389.8 | 20.3 |

MAGNETIC RECORDING MEDIUM AND MAGNETIC STORAGE DEVICE

CROSS-REFERENCE TO RELATED APPLICATION

This patent application is based on Japanese Priority Patent Application No. 2004-377037 filed on Dec. 27, 2004, the entire contents of which are hereby incorporated by reference.

BACKGROUND OF THE INVENTION

1. Field of the Invention

The present invention generally relates to a magnetic recording medium and a magnetic storage device employing an in-plane magnetic recording method.

2. Description of the Related Art

Recently and continuing, magnetic storage devices, for example, magnetic disk drives, are widely used for storing digitized moving picture data or music data. Especially, the magnetic storage devices are being used for storing moving picture data at home to replace the conventional home video tape devices, and because of the high access speed, compactness, and large capacity, the market for the magnetic storage devices is increasing rapidly. Because of the large size of the data to be recorded, for example, the moving picture data, the magnetic storage devices are required to have storage capacity as large as possible. So far, the recording density of the magnetic storage devices has been increased by 100% every year. In order to further increase the recording density, it is indispensable to develop techniques to further increase the recording density of magnetic recording media and magnetic recording heads.

One of the methods of increasing the recording density of a magnetic recording medium is to reduce medium noise so as to improve the signal-to-medium noise ratio. The medium noise is comprised of direct-current demagnetization noise and transition noise. If a recording layer is a metal film, the transition noise is dominant in the medium noise. The transition noise depends on a magnetization transition width a, hence, if the magnetization transition width a is reduced, the transition noise decreases accordingly. It is reported that the magnetization transition width a is expressed by the following formula (refer to T. C. Arnoldussen et al., IEEE Trans. Magn., 36, (2000) pp. 92-97).

$$a = 3.25 \times (1.89 - 1.11 S^*) \sqrt{(Mr \times d) \times df/Hc}$$

where, $S^*$ represents coercive force squareness of the recording layer, $Mr$ represents the residual magnetization of the recording layer, $d$ represents the thickness of the recording layer, $df$ represents an effective magnetic spacing between a magnetic recording medium and a magnetic recording head, and $Hc$ represents the coercive force of the recording layer.

From the above formula, in order to reduce the magnetization transition width a, it is just needed to increase the coercive force squareness $S^*$, or decrease the product of $Mr \times d$, or increase the coercive force $Hc$. Particularly, the increase of the coercive force squareness $S^*$ or the decrease of the product of $Mr \times d$ can be achieved by just reducing the thickness d of the recording layer. Namely, in the recording layer, while growing in the thickness direction, the crystal grains also grow in the width direction. By reducing the thickness d of the recording layer, growth of the crystal grains in the width direction can be suppressed. As a result, miniaturization of the crystal grains is improved, and the coercive force squareness $S^*$ is increased.

On the other hand, in order to increase the coercive force Hc of the recording layer, for example, when the recording layer is formed from CoCrPt-based alloys, it is effective to increase the inclusion of Pt. By increasing the coercive force Hc, the magnetization transition width a is reduced, and it is expected that this will improve the long-term stability of the residual magnetization recorded in the recording layer, in other words, improve a thermal fluctuation resistance of the recording layer.

For example, Japanese Laid-Open Patent Application No. 2001-52330 discloses a technique in this field.

However, reduction of the thickness d of the recording layer may results in decrease of the reproduction output. Further, along with reduction of the thickness d of the recording layer and miniaturization of the crystal grains, the volume occupied by a minimum recording zone magnetically formed in the recording layer decreases, and the thermal fluctuation resistance of the recording layer degrades.

In addition, when increasing the coercive force Hc of the recording layer formed from CoCrPt-based alloys by adding Pt, if Pt is over-added, a crystal structure of a CoCr phase skews, which is a parent phase of the recording layer, and this degrades crystalline properties of the recording layer, which in turn adversely increases the medium noise and degrades the thermal fluctuation resistance of the recording layer. Further, this results in, when recording data in the recording layer, an increase of the magnitude of a recording magnetic field applied to reverse the magnetization of the recording layer, and degrades recording properties such as the overwrite property. In other words, by merely increasing inclusion of Pt in the recording layer to increase the coercive force Hc, even if the coercive force Hc Pt is increased, the medium noise cannot be reduced, which is the original object, and eventually, the thermal fluctuation resistance may be lowered.

SUMMARY OF THE INVENTION

It is a general object of the present invention to solve one or more of the problems of the related art.

It is a more specific object of the present invention to provide a magnetic recording medium and a magnetic storage device that are able to increase a coercive force Hc of a recording layer and improve a signal-to-noise ratio of the recording layer without degradation of a thermal fluctuation resistance of the recording layer, and to enable high density recording.

According to a first aspect of the present invention, there is provided a magnetic recording medium, comprising: a substrate; a seed layer formed from a crystalline material on the substrate; a grain diameter control layer on the seed layer; an underlying layer on the grain diameter control layer; and a recording layer on the underlying layer, wherein the grain diameter control layer is formed from one of Ag, W, Cu, Mo, Cr, Au, Mn, Rh, Ta, V, and alloys of them.

According to the present invention, the grain diameter control layer is provided on the seed layer formed from a crystalline material, the grain diameter control layer being formed from one of Ag, W, Cu, Mo, Cr, Au, Mn, Rh, Ta, V, and alloys of them. The grain diameter control layer acts as growing nuclei of the underlying layer on the grain diameter control layer to control the diameter of grains in the underlying layer so as to ensure a good grain diameter distribution in the underlying layer. In addition, because the seed layer is formed from a crystalline material, it helps improve crystalline properties of the grain diameter control layer and the underlying layer. Therefore, the crystal of the recording layer is grown on the underlying layer having a good grain diameter distribution and good crystalline properties, and the recording layer inherits the good grain diameter distribution and good crystalline properties from the underlying layer. As a result, a magnetic recording medium can be provided in which the recording layer has a good grain diameter distribution, and thus be able to have an increased coercive force Hc and improve a signal-to-noise ratio without degradation of the thermal fluctuation resistance, thereby enabling high density recording.

As an embodiment, the seed layer may be formed from an alloy including a B2 crystal structure. Because of the B2 crystal structure of the seed layer, a crystal matching property between the seed layer and the underlying layer is improved, and this further improves the crystalline properties of the underlying layer.

As an embodiment, an average thickness of the grain diameter control layer may be set in a range from 0.1 nm to 5 nm. The grain diameter control layer may be formed to be dispersed or to be a continuous film. As described below, the average thickness is specified to be the average thickness of a continuous film which is supposed to be formed. When the grain diameter control layer is formed to be dispersed, the average thickness corresponds to an average in the area where the dispersed portions of the grain diameter control layer are actually formed.

In this way, the average thickness of the grain diameter control layer in the concerned area is specified, and a dispersed layer or a thin continuous film is deposited on the seed layer to act as a growing nucleus of the underlying layer formed thereon. Especially, when the grain diameter control layer is deposited to be a dispersed layer with the underlying layer therebelow to be exposed, the underlying layer is in contact with the seed layer, thereby improving the crystalline properties of the underlying layer.

According to a second aspect of the present invention, there is provided a magnetic storage device, comprising: a magnetic recording medium; a recording unit; and a recording and reproduction unit including a magneto-resistive reproduction element, wherein the magnetic recording medium includes: a substrate; a seed layer formed from a crystalline material on the substrate; a grain diameter control layer on the seed layer, said grain diameter control layer being formed from one of Ag, W, Cu, Mo, Cr, Au, Mn, Rh, Ta, V, and alloys thereof; an underlying layer on the grain diameter control layer; and a recording layer on the underlying layer.

According to the present invention, because the magnetic recording medium includes a recording layer having a high coercive force Hc in the recording direction and a good signal-to-noise ratio, it is possible to provide a magnetic storage device capable of high density recording.

According to a third aspect of the present invention, there is provided a magnetic disk drive, comprising: a magnetic disk medium; and a recording and reproduction unit, wherein the magnetic recording medium includes: a substrate disk; a seed layer formed from a crystalline material on the substrate disk; a grain diameter control layer on the seed layer, said grain diameter control layer being formed from one of Ag, W, Cu, Mo, Cr, Au, Mn, Rh, Ta, V, and alloys thereof; an underlying layer on the grain diameter control layer; and a recording layer on the underlying layer.

According to the present invention, because the magnetic recording medium includes a recording layer having a high coercive force Hc in the recording direction and a good signal-to-noise ratio, it is possible to provide a magnetic disk drive capable of high density recording.

These and other objects, features, and advantages of the present invention will become more apparent from the following detailed description of the preferred embodiments given with reference to the accompanying drawings.

BRIEF DESCRIPTION OF THE DRAWINGS

FIG. 4 is a table showing performance of the magnetic disks of example 1 and a magnetic disk as the example for comparison;

FIG. 5 is a table showing performance of the magnetic disks of example 2 and the magnetic disk as the example for comparison.

DESCRIPTION OF THE PREFERRED EMBODIMENTS

Figure 1:
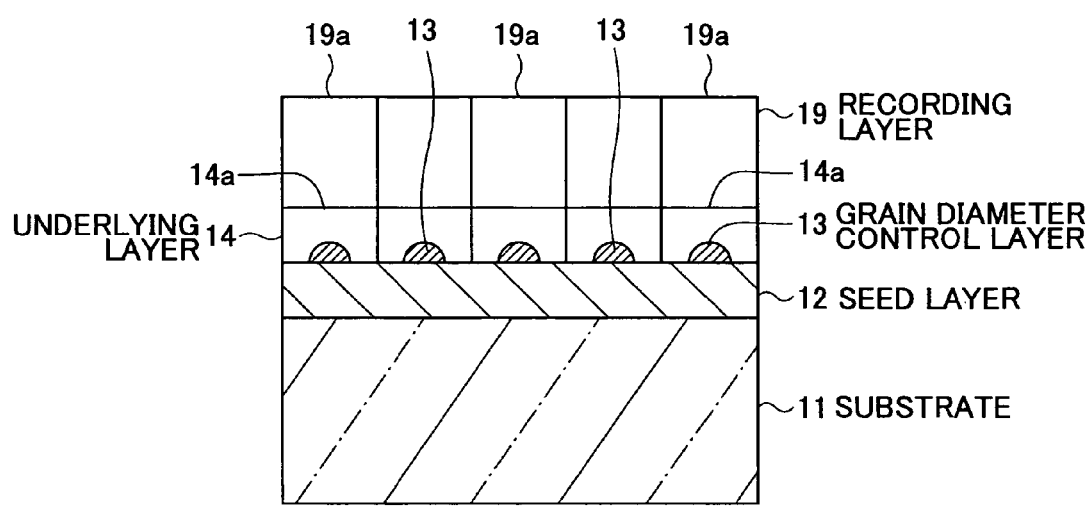
FIG. 1 is a schematic cross-sectional view illustrating a basic structure of a magnetic recording medium according to the present invention.

FIG. 1 is a schematic cross-sectional view illustrating a basic structure of a magnetic recording medium according to the present invention.

As illustrated in FIG. 1, the magnetic recording medium includes a substrate 11, a seed layer 12 on the substrate, a grain diameter control layer 13 on the seed layer 12, an underlying layer 14 on the grain diameter control layer 12, and a recording layer 19 on the underlying layer 14. The inventor of the present invention found that when the grain diameter control layer 13 is formed to be dispersed or to be continuous on the seed layer 12 formed from a crystalline material, the coercive force Hc in the in-plane direction of the recording layer 19 is increased and a good signal-to-noise ratio of the recording layer 19 is improved. For example, the grain diameter control layer 13 may be an Ag film or a W film.

Specifically, the grain diameter control layer 13 is deposited on the seed layer 12 to be a dispersed layer or a thin continuous film to act as a growing nucleus of the underlying layer 14 formed on the seed layer 12. Starting from the growing nucleus, crystal grains 14a of the underlying layer 14 grow, and further, crystal grains 19a of the recording layer 19 grow on the underlying layer 14. Namely, the diameter distributions of the crystal grains 14a of the underlying layer 14 and the crystal grains 19a of the recording layer 19 are determined in correspondence to the arrangement of the growing nucleus of the grain diameter control layer 13. It is thought that if the grain diameter control layer 13 is formed from Ag film or a W film, the growing nuclei of the grain diameter control layer 13 will be uniformly distributed, and this can reduce the width of the grain diameter distribution of the crystal grains 19a of the recording layer 19.

Generally, when the grain diameters of the crystal grains are small, the uniaxial anisotropy constant of the crystal grains is small. When the uniaxial anisotropy constant is small, the coercive force Hc of the recording layer 19 is decreased. In the magnetic recording medium of the present invention, because the width of the grain diameter distribution is reduced, this reduces the number of small crystal grains, namely, crystal grains causing decrease of the coercive force Hc of the recording layer, hence, the coercive force Hc of the recording layer 19 can be increased.

Here, for example, "width of grain diameter distribution of crystal grains" can be defined to be a FWHM (Full-Width at Half Maximum) of the maximum diameter of the crystal grains under study, for example, measured from a histogram of the grain diameter in a coordinate system with the abscissa to be the grain diameter of crystal grains of the recording layer 19, and the ordinate to be counts.

In addition, because the seed layer 12 is formed from a crystalline material, and the grain diameter control layer 13 is formed on the crystalline seed layer 12, the crystalline properties of the grain diameter control layer 13 are maintained to be good. Further, when the grain diameter control layer 13 is formed to be dispersed, the underlying layer 14 is in contact with the crystalline seed layer 12; thus, the crystalline properties of the underlying layer 14 are maintained to be good.

That is, because the width of the grain diameter distribution of the crystal grains in the recording layer 19 can be reduced, the crystalline properties of the recording layer 19 are obtainable. It is thought that this can increase the coercive force Hc in the in-plane direction of the recording layer 19, and improve the signal-to-noise ratio of the recording layer 19.

Below, preferred embodiments of the present invention are explained with reference to the accompanying drawings.

First Embodiment

Figure 2:
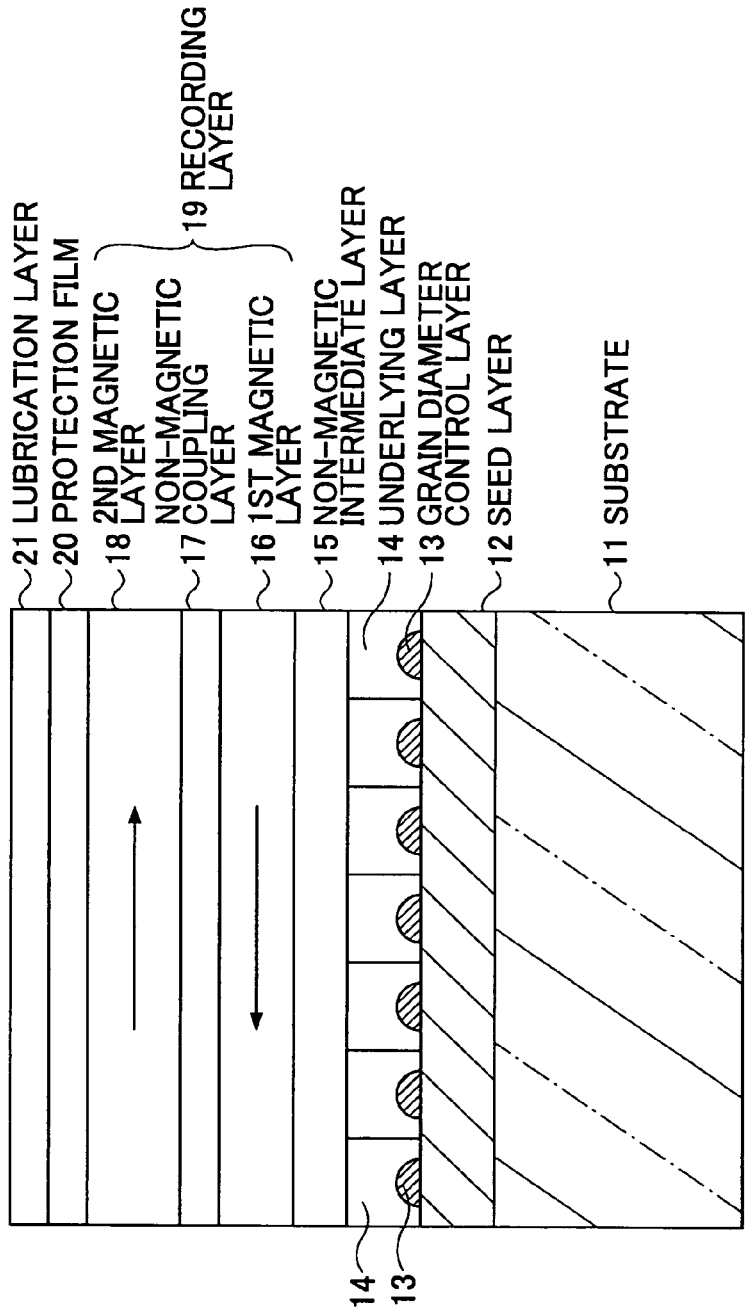
FIG. 2 is a schematic cross-sectional view illustrating an example of a magnetic recording medium according to a first embodiment of the present invention.

FIG. 2 is a schematic cross-sectional view illustrating an example of a magnetic recording medium according to a first embodiment of the present invention.

As illustrated in FIG. 2, the magnetic recording medium 10 includes a substrate 11, a seed layer 12 on the substrate, a grain diameter control layer 13 on the seed layer 12, an underlying layer 14 on the grain diameter control layer 13, a non-magnetic intermediate layer 15 on the underlying layer 14, a recording layer 19 on the non-magnetic intermediate layer 15, a protection film 20, and a lubrication layer 21. The recording layer 19 is a stacked structure including a first magnetic layer 16, a non-magnetic coupling layer 17, and a second magnetic layer 18.

There are no limitations on the substrate 11, for example, the substrate 11 may be a glass substrate, an aluminum alloy substrate with NiP coating, a silicon substrate, a plastic substrate, a ceramic substrate, or a carbon substrate.

On the surface of the substrate 11, a texture of plural grooves along a recording direction (when the magnetic recording medium 10 is a magnetic disk, the recording direction is along the circumferential direction) may be formed, for example, the texture may be a mechanical texture. Because of the texture, the magnetization easy axes of the first magnetic layer 16 and the second magnetic layer 18 can be aligned along the recording direction. Instead of forming the texture on the surface of the substrate 11, the texture may also be formed on the surface of the first magnetic layer of the magnetic recording medium according to a second embodiment as described below in FIG. 3.

The seed layer 12 is formed from crystalline metal or alloys, or intermetallic compounds. The seed layer 12 may also be formed from an alloy including a B2 crystal structure, preferably, an AlRu alloy or an NiAl alloy. When using such materials, it is possible to improve the crystalline properties of the grain diameter control layer 13 on the seed layer 12.

Preferably, the thickness of the seed layer 12 is set in a range from 5 nm to 100 nm, and a thicker seed layer 12 is more preferable because a thick seed layer 12 has better crystalline properties. In the magnetic recording medium of the related art, the underlying layer is arranged on the seed layer directly, and it was accepted that a thinner seed layer was preferable. Specifically, in the magnetic recording medium of the related art, if the seed layer becomes thick, diameters of the crystal grains constituting the seed layer increase, and the large crystal grain diameters are inherited by the underlying layer and the recording layer, causing an increase of the medium noise. For this reason, in the related art, the seed layer is made thin to prevent an increase of the diameters of the crystal grains of the seed layer. However, because the crystalline property of a thin seed layer is not sufficiently good, in the related art, it is difficult to improve the crystalline properties of the underlying layer.

In contrast, in the present invention, because the grain diameter control layer 13 for controlling crystal grain diameters is provided on the seed layer 12, the grain diameter control layer 13 is able to control crystal grain diameters and allows a thick seed layer 12 so as to improve the crystalline properties of the seed layer 12. As a result, it is possible to obtain both good crystal grain diameter control and good crystalline properties of the underlying layer 14.

The grain diameter control layer 13 may be formed from one of Ag, W, Cu, Mo, Cr, Au, Mn, Rh, Ta, V, and alloys of these metals. It is preferable to use the above metals as single elements. It is more preferable that the grain diameter control layer 13 be formed from Ag or W, or alloys including Ag and alloys including W. That is, with Ag or W as the main component and other elements being added.

The grain diameter control layer 13 may be deposited on the surface of the seed layer 12 to be dispersed or to be a continuous film, and preferably, the grain diameter control layer 13 is a dispersed film. In other words, the grain diameter control layer 13 is not a continuous film extending in the in-plane direction of the film, but includes discrete portions, like dispersed islands. It is preferable that the seed layer 12 be exposed between two adjacent islands. In order to form such a grain diameter control layer 13, the amount of material to be used for depositing the grain diameter control layer 13 should be reduced.

For example, when the grain diameter control layer 13 is deposited by sputtering, a sputtering target formed from a material constituting the grain diameter control layer 13 is sputtered at a predetermined sputtering power. When deposition of the thus generated sputtering particles on the seed layer 12 begins, discrete portions (islands) are formed first. Then, while the deposition continues, the islands grow in the in-plane direction, forming a continuous film. When it is desired to form only the discrete portions (islands), sputtering is stopped before the islands connect with each other to become a continuous film.

The average thickness of the grain diameter control layer 13 may be in a range from 0.1 nm to 5 nm, and preferably, in a range from 0.1 nm to 4 nm.

For example, the average thickness of the grain diameter control layer 13 may be measured as following. With various sputtering power levels, continuous grain diameter control layers of different thicknesses are formed; with a fluorescent X-ray thickness meter, thicknesses of the continuous grain diameter control layers are measured; then the relation between the sputtering power and thickness of the continuous grain diameter control layers is determined; with this relation, the thickness of the grain diameter control layer 13 is determined. Hence, if the thickness of the grain diameter control layer 13 is close to the lower end in the above range from 0.1 nm to 5 nm or preferably from 0.1 nm to 4 nm, it is highly probable that the grain diameter control layer 13 will be formed to be a dispersed film, and if the thickness of the grain diameter control layer 13 is close to the higher end in the above range, it is highly probable that the grain diameter control layer 13 will be formed to be a continuous film. Sometimes, it might be unclear whether the grain diameter control layer 13 is dispersed or continuous.

The underlying layer 14 has a bcc crystal structure, and is formed from Cr or alloys Cr—X1 (where, X1 represents one of Mo, W, V, B, Mo). Preferably, the thickness of the underlying layer 14 is set in a range from 3 nm to 10 nm. If the underlying layer 14 is formed from an alloy Cr—X1, when the non-magnetic intermediate layer 15 is arranged on the underlying layer 14, the crystal matching property between the underlying layer 14 and the non-magnetic intermediate layer 15 is improved, and this further improves the crystalline properties of the first magnetic layer 16 and the second magnetic layer 18.

The underlying layer 14 may be a multi-layer including multiple layers formed from Cr or Cr—X1 alloys. With the multi-layer, it is possible to suppress growth of the crystal grains in the underlying layer 14, and further suppress growth of the crystal grains in the first magnetic layer 16 and the second magnetic layer 18.

When the grain diameter control layer 13 is deposited to be a dispersed film, the underlying layer 14 is formed to cover the seed layer 12 and the grain diameter control layer 13. In this case, the underlying layer 14 grows on the seed layer 12 with the grain diameter control layer 13 being growing nuclei, and if the seed layer 12 is formed from an alloy including a B2 crystal structure, the crystal matching property between the seed layer 12 and the underlying layer 14 is very good, and this further improves the crystalline properties of the underlying layer 14.

The non-magnetic intermediate layer 15 is arranged between the recording layer 19 and the underlying layer 14, and is formed from a non-magnetic material represented by Co—X2 having a hcp structure (hexagonal closed packed structure), where X2 represents one of Cr, Ta, Mo, Mn, Re, Ru, and alloys of them. The thickness of the non-magnetic intermediate layer 15 is set in a range from 0.5 nm to 5.0 nm, preferably, from 0.5 nm to 3.0 nm.

The non-magnetic intermediate layer 15 is epitaxially grown on the surface of the underlying layer 14, and inherits the good grain diameter distribution and good crystalline properties of the underlying layer 14. Further, the non-magnetic intermediate layer 15 also affects the good grain diameter distributions and good crystalline properties of the first magnetic layer 16 and the second magnetic layer 18, which are epitaxially grown on the non-magnetic intermediate layer 15.

The non-magnetic intermediate layer 15 may also be a multi-layer including multiple layers formed from Co or Cr—X2 alloys. Further, the non-magnetic intermediate layer 15 may also be omitted.

The recording layer 19 is a stacked structure including the first magnetic layer 16, the non-magnetic coupling layer 17, and the second magnetic layer 18. The first magnetic layer 16 and the second magnetic layer 18 have an exchanging coupling structure, namely, the first magnetic layer 16 and the second magnetic layer 18 are coupled by antiferromagnetic exchanging coupling through the non-magnetic coupling layer 17.

The magnetization of the first magnetic layer 16 and the magnetization of the second magnetic layer 18 aligned in the in-plane direction are anti-parallel to each other when there is no external magnetic field applied.

The first magnetic layer 16 is formed from ferromagnetic materials such as Co, Ni, Fe, Co-based alloys, Ni-based alloys, or Fe-based alloys. The thickness of the first magnetic layer 16 is set in a range from 0.5 nm to 20 nm. Among the Co-based alloys, CoCr, CoCr-based alloys, CoCrTa, CoCrTa-based alloys, CoCrPt, and CoCrPt-based alloys are preferable. Especially, from the point of view of grain diameter control of crystal grains in the first magnetic layer 16, more preferably, the first magnetic layer 16 is formed from CoCr—M1, where, M1 represents Pt, B, Ta, Ni, Cu, Ag, Pd, Si, C, Fe, Re, Nb, Hf, or alloys of the above metals. Further, from the point of view of improving crystal orientation of the second magnetic layer 18, it is preferable that the first magnetic layer 16 be formed as a multi-layer including multiple ferromagnetic layers.

The non-magnetic coupling layer 17 may be formed from Ru, Rh, Ir, Ru-based alloys, Rh-based alloys, or Ir-based alloys, among which, Rh and Ir have a fcc structure (face-centered cubic structure), and Ru has a hcp structure (hexagonal closed packed structure).

When the second magnetic layer 18, which is on the non-magnetic coupling layer 17, has a hcp structure, it is preferable that the non-magnetic coupling layer 17 be formed from Ru, and Ru-based alloys. Especially, when the second magnetic layer 18 is formed from CoCrPt-based alloys having a hcp structure, because the lattice constant a of CoCrPt-based alloys equals 0.25 nm, whereas the lattice constant a of Ru equals 0.27 nm, close to that of CoCrPt-based alloys, it is preferable that the non-magnetic coupling layer 17 be formed from Ru, or Ru-based alloys. Ru-based alloys may include Ru and Co, Cr, Fe, Ni, or Mn, or Ru and alloys of these metals.

The thickness of the non-magnetic coupling layer 17 is set in a range from 0.4 nm to 1.2 nm. With the thickness of the non-magnetic coupling layer 17 being set in this range, the first magnetic layer 16 and the second magnetic layer 18 can be coupled by antiferromagnetic exchanging coupling through the non-magnetic coupling layer 17.

The second magnetic layer 18 is formed from ferromagnetic materials such as Co, Ni, Fe, Co-based alloys, Ni-based alloys, or Fe-based alloys. The thickness of the second magnetic layer 18 is set in a range from 5 nm to 20 nm. Among the Co-based alloys, CoCr, CoCr-based alloys, CoCrTa, CoCrTa-based alloys, CoCrPt, and CoCrPt-based alloys are preferable. Especially, from the point of view of grain diameter control of crystal grains in the second magnetic layer 18, the same as the first magnetic layer 16, it is more preferably that the second magnetic layer 18 be formed from CoCr—M1, where M1 represents Pt, B, Ta, Ni, Cu, Ag, Pd, Si, C, Fe, Re, Nb, Hf, or alloys of the above metals. Further, from the point of view of an anisotropic magnetic field of the second magnetic layer 18, it is still more preferable that the second magnetic layer 18 be formed from CoCrPt—M2, where M2 represents B, Ta, Ni, Cu, Ag, Pd, Si, C, Fe, Re, Nb, Hf, or alloys of the above metals.

As for the relation between the first magnetic layer 16 and the second magnetic layer 18, it is preferable that the product of the residual magnetization (Mr) and the film thickness (t), namely, the so-called "residual areal magnetization (Mr×t)", satisfy $Mr1 \times t1 < Mr2 \times t2$, where, Mr1 and Mr2 represent the residual magnetizations of the first magnetic layer 16 and the second magnetic layer 18, respectively, and t1, t2 represent film thicknesses of the first magnetic layer 16 and the second magnetic layer 18, respectively. With such a relation being satisfied, the recording layer 19 essentially has a residual areal magnetization of a magnitude of $Mr2 \times t2 - Mr1 \times t1$; hence, the residual magnetization of the recording layer 19 is in the same direction as that of the second magnetic layer 18.

Preferably, the effective magnitude of the residual magnetization (Mr2×t2−Mr1×t1) is set in a range from 2.0 nTm to 10.0 nTm.

The ferromagnetic materials constituting the second magnetic layer 18 may be different from those forming the first magnetic layer 16. For example, the ferromagnetic materials constituting the second magnetic layer 18 may have a larger anisotropic magnetic field than the ferromagnetic materials constituting the first magnetic layer 16. Specifically, ferromagnetic materials not including Pt may be used for the first magnetic layer 16, and ferromagnetic materials including Pt may be used for the second magnetic layer 18. Alternatively, the second magnetic layer 18 may be formed from ferromagnetic materials of higher Pt concentration than that of ferromagnetic materials forming the first magnetic layer 16.

As described above, the first magnetic layer 16 and the second magnetic layer 18 are coupled by antiferromagnetic exchanging coupling through the non-magnetic coupling layer 17, thereby forming the above-mentioned recording layer 19. Because the effective volume of the residual magnetization formed when recording equals the sum of the first magnetic layer 16 and the second magnetic layer 18 coupled by exchanging coupling, the effective volume of the residual magnetization increases compared to that of a recording layer having a single layer structure. In other words, in the formula Ku*V/kT, the quantity V increases, thereby improving thermal fluctuation resistance of the recording layer.

The recording layer 19 is not limited to the structure having two magnetic layers, it may also have three or more magnetic layers. The magnetic layers are coupled with each other by exchanging coupling, and it is only required that at least two of the magnetic layers be coupled by antiferromagnetic exchanging coupling. In addition, as a modification to the magnetic recording medium of the present embodiment, the recording layer 19 may be formed from only one magnetic layer, for example, the second magnetic layer 18.

The protection film 20 may be 0.5 nm to 10 nm thick, preferably, 0.5 nm to 5 nm, and for example, may be formed from diamond-like carbon, nitride carbon, or amorphous carbon.

The lubrication layer 21 may be formed from an organic liquid lubricant agent, for example, AM3001 manufactured by Ausimont, which has a perfluoropolyether main chain, and terminal groups of —OH, or phenyl. Depending on types of the protection film 20, the lubrication layer 21 may also be omitted.

Except for the lubrication layer 21, the above-mentioned layers of the magnetic recording medium 10 may be fabricated by vacuum processes such as sputtering, evaporation, CVD (Chemical Vapor Deposition), or wet processes such as electro-plating, or electroless-plating. The lubrication layer 21 may be fabricated by a dipping method such as lifting, depressing, or a coating method such as spin-coating.

In the magnetic recording medium 10 of the present embodiment, because the grain diameter control layer 13 is provided on the seed layer 12 formed from a crystalline material, the grain diameter control layer 13 acts as growing nuclei of the underlying layer 14 on the grain diameter control layer 14, while improving crystalline properties of the seed layer 12, the grain diameter control layer 13, and the underlying layer 14. Thereby, widths of grain diameter distributions of crystal grains of the first magnetic layers 16 and the second magnetic layers 18 are reduced, and crystalline properties of the crystal grains are improved. As a result, the coercive forces Hc of the first magnetic layer 16 and the second magnetic layer 18 in the in-plane direction, and the signal-to-noise ratio are improved. Thus, it is possible to use the magnetic recording medium 10 of the present embodiment for high density recording.

Figure 3:
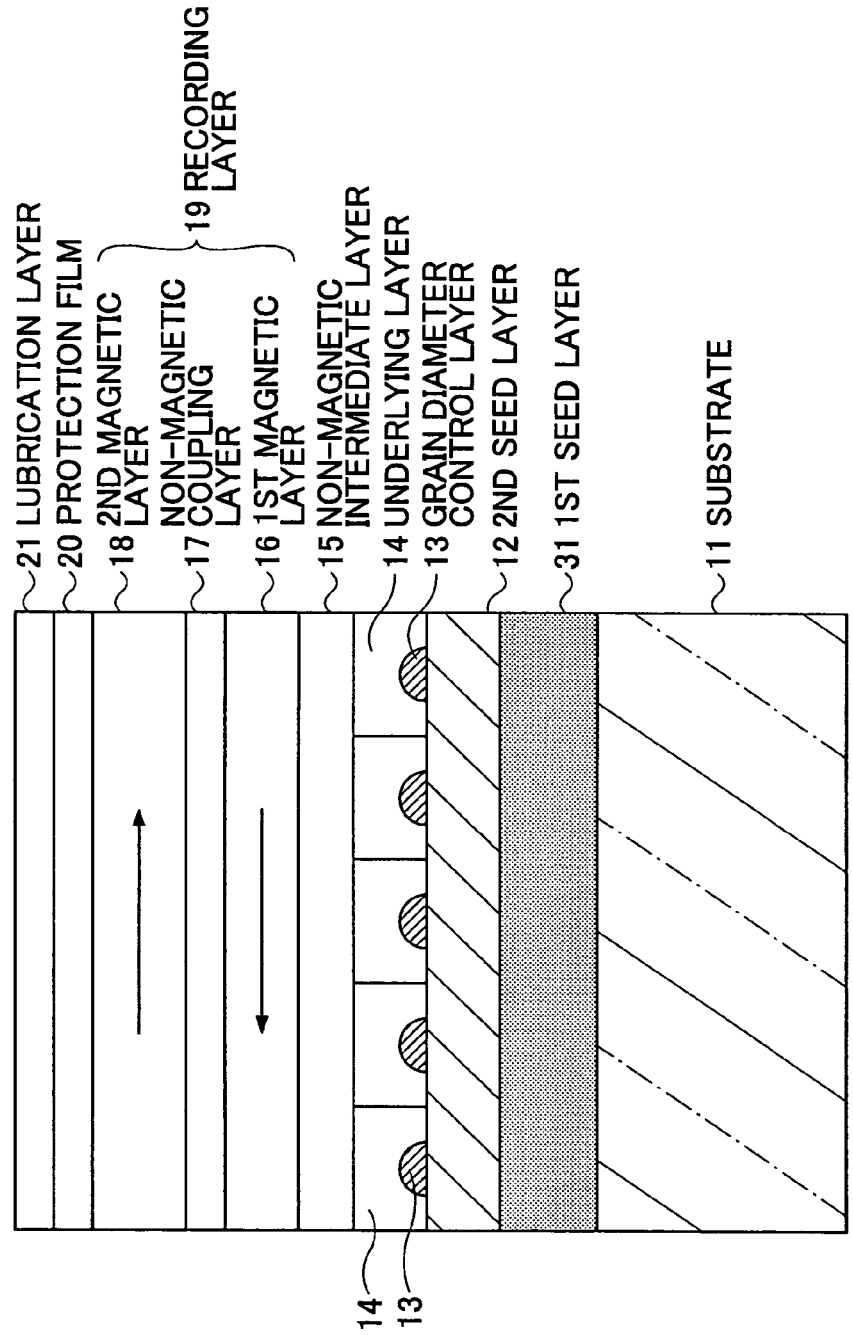
FIG. 3 is a schematic cross-sectional view illustrating another example of the magnetic recording medium according to the first embodiment of the present invention.

FIG. 3 is a schematic cross-sectional view illustrating another example of the magnetic recording medium according to the first embodiment of the present invention.

The magnetic recording medium 30 in FIG. 3 is a modification to the magnetic recording medium 10 in FIG. 2. In FIG. 3, the same reference numbers are assigned to the same elements as those described previously, and overlapping descriptions are omitted.

As illustrated in FIG. 3, the magnetic recording medium 10 includes a substrate 11, a first seed layer 31 on the substrate, a second seed layer 12, a grain diameter control layer 13 on the second seed layer 12, an underlying layer 14 on the grain diameter control layer 13, a non-magnetic intermediate layer 15 on the underlying layer 14, a recording layer 19 on the non-magnetic intermediate layer 15, a protection film 20, and a lubrication layer 21. The recording layer 19 is a stacked structure including a first magnetic layer 16, a non-magnetic coupling layer 17, and a second magnetic layer 18.

As shown in FIG. 3 and FIG. 2, the magnetic recording medium 30 is the same as the magnetic recording medium 10 except that an additional seed layer 31 is provided. It is also apparent that the second seed layer 12 in the magnetic recording medium 30 is the same as the seed layer 12 in the magnetic recording medium 10.

The first seed layer 31 is formed from alloys having three or more metals with non-magnetic and amorphous CoW, CrTi, NiP, or alloys of them as main components. The thickness of the first seed layer 31 is set in a range from 5 nm to 100 nm. Because the first seed layer 31 is amorphous, hence to be uniform crystallographically, it is not easy for the second seed layer 12 to be influenced in crystallographic anisotropy compared to direct arrangement of the second seed layer 12 on the substrate. Thereby, it is easy to form the crystal structure of the second seed layer 12. As a result, the second seed layer 12 positively influences the grain diameter control layer 13 and the underlying layer 14 to execute the above functions, resulting in remarkable effects. More remarkable effects are obtainable when the second seed layer 12 has a B2 crystal structure.

The magnetic recording medium 30 gives the same effects as, but the effects are more remarkable than, those of the magnetic recording medium 10. Namely, the coercive forces Hc of the recording layer 19 in the in-plane direction and the signal-to-noise ratio are improved more compared to the magnetic recording medium 10.

Below, descriptions are given of actual examples of the magnetic recording medium fabricated according to the present embodiment.

Example 1

After the surface of a glass substrate is cleaned, magnetic disks were fabricated to have the following structure.

The obtained magnetic disk included a glass substrate of a diameter 65 mm, a first seed layer made from a $Cr_{50}Ti_{50}$ film and 50 nm in thickness, a second seed layer made from an $Al_{50}Ru_{50}$ film and 80 nm in thickness, a grain diameter control layer made from an Ag film, an underlying layer made from a $Cr_{75}Mo_{25}$ film and 5 nm in thickness, a non-magnetic intermediate layer made from a $CO_{58}Cr_{42}$ film and 1 nm in thickness, a first magnetic layer made from a $CO_{88}Cr_{12}$ film and 2.3 nm in thickness, a non-magnetic coupling layer made from a Ru film and 0.7 nm in thickness, a second magnetic layer made from a CoCrPtBCu film and 18 nm in thickness, a protection film made from a carbon film and 5 nm in thickness, and a lubrication layer made from a lubricant AM3001 and 1.5 nm in thickness. Here, in the composition formulae, the numeral figures indicate an atomic percentage. The average thickness of the Ag film acting as the grain diameter control layer was deposited to be distributed in a range from 0.5 nm to 5.0 nm, hence obtaining six magnetic disks. The six magnetic disks are denoted to be magnetic disk 1-1 through magnetic disk 1-6. The average thickness data of the Ag films in the magnetic disk 1-1 through magnetic disk 1-6 are presented in FIG. 4 below. The thicknesses of the Ag films in the magnetic disk 1-1 through magnetic disk 1-6 were specified so that the net residual areal magnetization of the first magnetic layer and the second magnetic layer in the magnetic disk 1-1 through magnetic disk 1-6 was equal to 3.5 nTm. Here, the average thickness of the Ag film was specified to be the thickness of a continuous film which is supposed to be formed.

The above layers were fabricated under the following conditions. First, before forming the $Cr_{50}Ti_{50}$ film, the glass substrate was heated to 200° C. in vacuum by using a PBN (Pyrolytic Boron Nitride) heater of a heating apparatus. Next, the above layers were fabricated from the $Cr_{50}Ti_{50}$ film to the carbon film sequentially by using a DC Magnetron sputtering device in an argon gas atmosphere at a pressure of 0.67 Pa. Then, the lubrication layer was coated on the surface of the carbon film by the lifting method.

In the above process, the vacuum chamber of the heating apparatus and the DC Magnetron sputtering device were first pumped to be at a high vacuum of $1\times10^{-5}$ Pa or even higher, and then the argon gas is supplied until reaching the preset pressure.

Example 2

The magnetic disk of the second example is the same as the magnetic disk of the first example except that the Ag film acting as the grain diameter control layer is replaced by a W film.

The average thickness of the W film was distributed in a range from 0.5 nm to 5.0 nm, hence obtaining six magnetic disks. The six magnetic disks are denoted to be magnetic disk 2-1 through magnetic disk 2-6.

The average thickness data of the W films in the magnetic disk 2-1 through magnetic disk 2-6 are presented in FIG. 5 below, and the thicknesses of the W films in the magnetic disk 1-1 through magnetic disk 1-6 were specified in the same way as the Ag film in the first example.

Example for Comparison

A magnetic disk was fabricated as an example for comparison. The magnetic disk as an example for comparison is the same as the magnetic disk of the first example except that the Ag film as the grain diameter control layer is not formed.

FIG. 4 is a table showing performance of the magnetic disks of the example 1 and the magnetic disk as the example for comparison.

The coercive force indicated in the table in FIG. 4 is in the in-plane direction of the recording layer. The coercive force is measured by using a Vibrating Sample Magnetometer (VSM), while applying a magnetic field (maximum magnetic field: 790 kA/m) in the in-plane direction of the magnetic disk. The signal-to-noise (S/N) ratio is defined to be the ratio of an isolated wave output over the medium noise. The isolated wave output is specified to be an average output S (μV) with a linear recording density to be 104 kFCI, the medium noise N (μVrms) corresponds to a sum of transition noise and DC demagnetization noise. It is defined that S/N ratio (dB) =20 log(S/N).

As shown in FIG. 4, compared to the magnetic disk for comparison, the coercive force and the S/N ratio are improved in the magnetic disk 1-1 through magnetic disk 1-5, that is, the magnetic disks in which the average thickness of the Ag film acting as the grain diameter control layer was 0.5 nm, 1.0 nm, 2.0 nm, 3.0 nm, and 4.0 nm, respectively. While for the magnetic disk 1-6, which has an average thickness of the Ag film to of 5.0 nm, the coercive force decreases slightly compared to the magnetic disk for comparison, but the S/N ratio is equivalent to that of the magnetic disk for comparison. Therefore, from these results in FIG. 4, it is concluded that when the average thickness of the Ag film is less than 5.0 nm, the S/N ratio is improved compared to the magnetic disk for comparison.

Although experiments were not made with the average thickness of the Ag film being less than 0.5 nm, since the coercive force clearly increases and the S/N ratio is clearly improved in the magnetic disk 1-1 having a 0.5 nm thick Ag film compared to the magnetic disk for comparison, it can be assumed that the coercive force and the S/N ratio could be improved even when the average thickness of the Ag film is reduced to be as thin as 0.1 nm. In other words, according to the method of determining the average thickness, an average thickness of 0.1 nm corresponds to one layer of Ag atoms, that is, in an island-like manner.

Consequently, according to the example 1, it is confirmed that the coercive force and the S/N ratio are improved compared to the magnetic disk for comparison when the average thickness of the Ag film is greater than or equal to 0.5 nm and is less than or equal to 4.0 nm. Further, it is expected that the coercive force and the S/N ratio can be improved compared to the magnetic disk for comparison when the average thickness of the Ag film is greater than or equal to 0.1 nm and is less than 5.0 nm. Moreover, because the coercive force is improved compared to the magnetic disk for comparison, it is expected that the thermal fluctuation resistance is also improved compared to the magnetic disk for comparison.

FIG. 5 is a table showing performance of the magnetic disks of the example 2 and the magnetic disk as the example for comparison.

The coercive force and the S/N ratio shown in the table in FIG. 5 are defined and measured in the same way as those described with reference to FIG. 4. For convenience of explanation, the example for comparison in FIG. 5 is the same as that shown in FIG. 4.

As shown in FIG. 5, compared to the magnetic disk for comparison, the coercive force is improved in the magnetic disk 2-1 through magnetic disk 2-6, that is, the magnetic disks in which the average thickness of the W film acting as the grain diameter control layer was from 0.5 nm to 5.0 nm.

In addition, compared to the magnetic disk for comparison, the S/N ratio is improved in the magnetic disk 2-1 through magnetic disk 2-5, that is, the magnetic disks with the average thickness of the W film to be 0.5 nm, 1.0 nm, 2.0 nm, 3.0 nm, and 4.0 nm thick, respectively. While for the magnetic disk 2-6, which has an average thickness of the W film to of 5.0 nm, the coercive force is improved whereas the S/N ratio is equivalent to that of the magnetic disk for comparison. Therefore, from these results in FIG. 5, it is concluded that when the average thickness of the W film as the grain diameter control layer is less than 5.0 nm, the S/N ratio is improved compared to the magnetic disk for comparison.

Consequently, according to the example 2, it is confirmed that the coercive force and the S/N ratio are improved compared to the magnetic disk for comparison when the average thickness of the W film is greater than or equal to 0.5 nm and is less than or equal to 4.0 nm. Further, it is expected that the coercive force and the S/N ratio can be improved compared to the magnetic disk for comparison when the average thickness of the W film is greater than or equal to 0.1 nm and is less than 5.0 nm. The reason of setting the lower limit of the average thickness of the W film to be 0.1 nm is the same as the Ag film.

Second Embodiment

Figure 6:
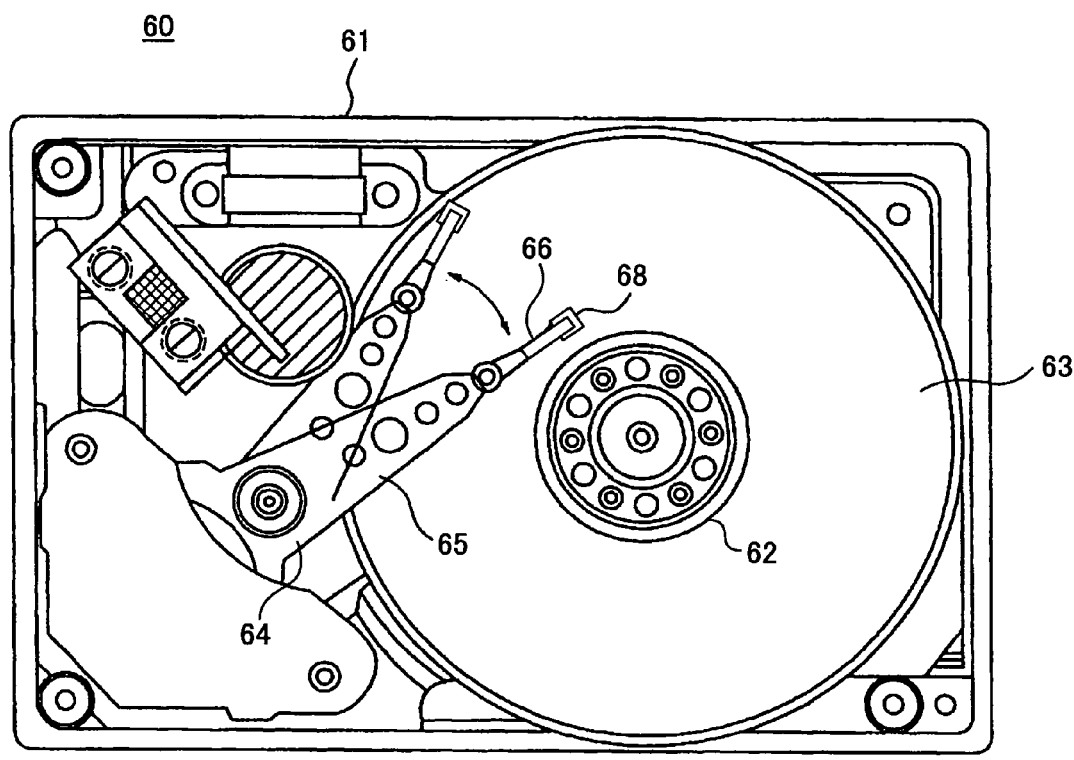
FIG. 6 is a schematic view illustrating a principal portion of a magnetic storage device according to a second embodiment of the present invention, which has a magnetic recording medium of the present invention.

FIG. 6 is a schematic view illustrating a principal portion of a magnetic storage device according to a second embodiment of the present invention, which has a magnetic recording medium of the present invention.

As illustrated in FIG. 6, a magnetic storage device 60 has a housing 61. In the housing 61, there are arranged a hub 62 driven by a not-illustrated spindle, a magnetic recording medium 63 fixed at the hub 62 and driven to rotate, an actuator unit 64, an arm 65 and a suspension 66 which are attached to the actuator unit 64 and move in a radial direction of the magnetic recording medium 63, and a magnetic head 68 supported by the suspension 66. The magnetic head 68 is a composite head including a reproduction head and an induced-type recording head, and the reproduction head may be an MR element (a Magneto-resistive element), a GMR element (a Giant-Magneto-resistive element), or a TMR element (a Tunneling Magneto-resistive element).

Because the basic configuration of the magnetic storage device 60 is well known, a detailed description thereof is omitted here.

The magnetic recording medium 63, for example, is the magnetic recording medium 10 or 30 as described in the first embodiment. Because the magnetic recording medium 63 has a high coercive force Hc in the in-plane direction of a recording layer thereof and a good signal-to-noise ratio, the magnetic storage device is capable of high density recording.

The basic configuration of the magnetic storage device of the present embodiment is not limited to that illustrated in FIG. 6, and the magnetic head 68 is not limited to the above structure, either. Any well-known magnetic head can be used.

While the invention is described above with reference to specific embodiments chosen for purpose of illustration, it should be apparent that the invention is not limited to these embodiments, but numerous modifications could be made thereto by those skilled in the art without departing from the basic concept and scope of the invention.

For example, although the magnetic recording medium of the present invention is described with a magnetic disk as an example, the magnetic recording medium of the present invention may also be a magnetic tape, in which instead of a disk-shape substrate, a PET tape, a PEN tape, or a polyimide plastic film can be used as the substrate.

According to the present invention, because the magnetic recording medium includes a recording layer having a high coercive force Hc in the recording direction and a good signal-to-noise ratio, it is possible to provide a magnetic storage device capable of high density recording.

What is claimed is:

1. A magnetic recording medium, comprising:
    a substrate;
    a seed layer formed from a crystalline alloy including a B2 crystal structure on the substrate;
    a grain diameter control layer on the seed layer in direct contact therewith;
    an underlying layer formed to cover the seed layer and the grain diameter control layer, said underlying layer being in direct contact with the seed layer; and
    a recording layer on the underlying layer;
    wherein the grain diameter control layer is formed from one of Ag, alloys including Ag, W, and alloys including W, and is a dispersed film.

2. The magnetic recording medium as claimed in claim 1, wherein the seed layer is formed from one of an AlRu alloy or an NiAl alloy.

3. The magnetic recording medium as claimed in claim 1, wherein a thickness of the seed layer is set in a range from 5 nm to 100 nm.

4. The magnetic recording medium as claimed in claim 1, wherein another seed layer is formed between the substrate and said seed layer, said another seed layer being formed from one of amorphous CoW, CrTi, and NiP.

5. The magnetic recording medium as claimed in claim 1, wherein an average thickness of the grain diameter control layer is set in a range from 0.1 nm to 5 nm.

6. The magnetic recording medium as claimed in claim 1, wherein
    a non-magnetic intermediate layer is formed between the recording layer and the underlying layer, said non-magnetic intermediate layer being formed from a non-magnetic material represented by Co—X2, where X2 represents one of Cr, Ta, Mo, Mn, Re, Ru, and alloys of them.

7. The magnetic recording medium as claimed in claim 1, wherein
    the recording layer includes a stacked structure on the underlying layer, said stacked structure including a first magnetic layer, a non-magnetic coupling layer, and a second magnetic layer;
    the first magnetic layer and the second magnetic layer are coupled by exchanging coupling; and
    a magnetization of the first magnetic layer is anti-parallel to a magnetization of the second magnetic layer when an external magnetic field is not applied.

8. The magnetic recording medium as claimed in claim 7, wherein
    each of the first magnetic layer and the second magnetic layer is formed from alloys represented by CoCr—M1, where M1 represents one of Pt, B, Ta, Ni, Cu, Ag, Pd, Si, C, Fe, Re, Nb, Hf, and alloys thereof.

9. A magnetic storage device, comprising:
    a magnetic recording medium;
    a recording unit; and
    a recording and reproduction unit including a magneto-resistive reproduction element;
    wherein
    the magnetic recording medium includes
    a substrate;
    a seed layer formed from a crystalline alloy including a B2 crystal structure on the substrate;
    a grain diameter control layer on the seed layer in direct contact therewith, said grain diameter control layer being formed from one of Ag, alloys including Ag, W, and alloys including W, said grain diameter control layer being a dispersed film;
    an underlying layer formed to cover the seed layer and the grain diameter control layer, said underlying layer being in direct contact with the seed layer; and
    a recording layer on the underlying layer.

10. A magnetic disk drive, comprising:
    a magnetic disk medium; and
    a recording and reproduction unit,
    wherein the magnetic recording medium includes a substrate disk;

a seed layer formed from a crystalline alloy including a B2 crystal structure on the substrate disk;

a grain diameter control layer on the seed layer in direct contact therewith, said grain diameter control layer being formed from one of Ag, alloys including Ag, W, and alloys including W, said grain diameter control layer being a dispersed film;

an underlying layer formed to cover the seed layer and the grain diameter control layer, said underlying layer being in direct contact with the seed layer, and a recording layer on the underlying layer.

11. The magnetic recording medium as claimed in claim 1, wherein the grain diameter control layer includes a plurality of discrete portions so that the seed layer is exposed between the discrete portions.

* * * * *